United States Patent

[11] 3,601,810

[72] Inventors Duane H. Anderson
St. Paul, Minn.;
Peter A. Meyer, Roseville, Minn.; Paul D. Byrns, 123 J North McKnight Road, St. Paul, Minn. 55119

[21] Appl. No. 787,632
[22] Filed Dec. 30, 1968
[45] Patented Aug. 24, 1971
[73] Assignee Comcet Incorporated
St. Paul, Minn. by said Anderson and said Meyer

[54] SEGREGATION AND BRANCHING CIRCUIT
6 Claims, 6 Drawing Figs.

[52] U.S. Cl. .......... 340/172.5
[51] Int. Cl. .......... G06f 7/00
[50] Field of Search .......... 340/172.5; 235/157

[56] References Cited
UNITED STATES PATENTS

| | | | |
|---|---|---|---|
| 3,300,763 | 2/1967 | Hoehmann | 340/172.5 |
| 3,350,697 | 10/1967 | Hirvela | 340/172.5 |
| 3,351,917 | 11/1967 | Shimabukuro | 340/172.5 |
| 3,407,387 | 10/1968 | Looschen et al. | 340/172.5 X |

*Primary Examiner*—Paul J. Henon
*Assistant Examiner*—Harvey E. Springborn
*Attorney*—Alfred E. Hall ABSTRACT: A data storage control circuit which decodes incoming characters and produces signals which cause the characters themselves to be stored sequentially in a normal buffer area in memory or individually segregated in a second buffer area in memory or stored in both of these areas simultaneously and which can switch the normal buffer area to a predetermined location in memory whereby the incoming characters are routed away from the old buffer area in memory to the new buffer area.

INVENTORS
DUANE H. ANDERSON
PETER A. MEYER
PAUL D. BYRNS
BY Alfred E. Hall
ATTORNEY

SEGREGATION AND BRANCHING CIRCUIT

BACKGROUND OF THE INVENTION

One of the more important features in efficient operation of a computer is the manner of determining where incoming characters are to be stored in memory.

There are two different types of characters which must be considered. The first are data characters and the second are message control characters. Message control characters provide such information as when the Heading starts, when the Text starts, etc. Some of the more important characters are designated, for example, Start of Heading, Start of Text, End of Transmission, Acknowledge and End of Block. Obviously, there are many others.

In presently existing computer systems, each successive input character is stored in successive positions in an Input Buffer in Memory regardless of whether it is a data character or a message control character.

This poses a problem since, generally speaking, the message control characters have no further use after they have served their purpose as an indicator. It is then desired to separate the data words from the message control words. Presently existing systems utilize programming to extract the data words and store them in the proper locations.

A second problem that occurs is the necessity of determining whether or not it is desired to store the input data at all. Presently existing systems again utilize programming to make this determination.

Further, if it is desired to store the data, then it must be determined whether or not the data is to be stored in the normal buffer, a segregated buffer or switched to an entirely new buffer whereby the new buffer becomes the normal buffer. Again, these determinations are made by software in the prior art system.

It is obvious, then, that a serious disadvantage is inherent in prior art systems in the large amount of time required to first store the incoming data in the input buffer and then, after the condition has passed, make a software determination of what to do with the information stored therein.

SUMMARY

The present invention overcomes the disadvantage of present systems by utilizing hardware to automatically determine (1) whether or not the incoming data should be stored at all, (2) if it should be stored, whether it is to be stored in the normal buffer, a segregated buffer, both of these or switched into an entirely new buffer which becomes the normal buffer, and (3) whether or not the software should be alerted by means of an Interrupt.

Thus, incoming data is generally stored in what may be called a normal buffer. Under certain conditions it may be desired to place an input character in a second buffer temporarily selected for storing that particular input character. This second buffer may be selected in addition to the normal buffer or in place of it. The process is called segregation. Also, it may be necessary at times to place an incoming character and those that follow it into an entirely different buffer. This process is called Branching and selects a new buffer which now becomes the normal buffer. It should be noted that Branching and Segregation occur independently of reach other and therefore can occur individually or simultaneously.

In the present invention the format of the incoming character, itself, determines (1) whether or not the character is to be stored at all, (2) if it should be stored, whether it is to be stored in the normal buffer, a segregated buffer, both of these or switched into an entirely new buffer and (3) whether or not the software should be alerted by means of an interrupt.

A Code Detector receives all incoming characters whether they are data characters or message control characters. The structure or format of the incoming character causes the Code Detector to produce signals which select the normal buffer control word, segregation buffer control word and/or branching buffer control word. Further, the character format may cause the Code Detector to produce an interrupt signal which can alert the software under conditions such as End of Message, remote device has emergency procedures, etc.

Therefore, it can be seen that the signal or signals produced by the Code Detector select the proper Buffer Control Word and the input character is caused to be gated to the proper buffer locations.

It should be noted that a computer may be coupled to a plurality of line terminals each of which may produce characters in different codes. The Code Detector in the present invention decodes any character in any selected code and produces control signals which cause the individual character itself to be stored in a particular location in memory.

Thus, the present invention saves a considerable amount of processing time because it utilizes hardware to process incoming characters at the moment a condition occurs instead of utilizing software to process the incoming character after the condition has passed.

It is therefore an object of the present invention to provide a data storage control circuit which utilizes the incoming character itself to determine whether or not it should be stored and, if so, to produce control signals to select the proper buffer or buffers in which the incoming character is to be stored.

It is a further object of the present invention to provide a data storage control circuit in which the incoming character itself is utilized to produce control signals which temporarily diverts the incoming data and allows the character to be segregated and stored in a second buffer, either alone or in addition to the normal buffer.

It is yet another object of the present invention to provide a data storage control circuit in which the incoming character itself is utilized to produce control signals which diverts the incoming data and allow that character and subsequent characters to be branched and stored in one or more additional buffers.

It is still another object of the present invention to produce input characters in different codes, select one of said codes and decode individual characters in said selected code to produce control signals which cause the individual character itself to be stored in a particular location in memory.

BRIEF DESCRIPTION OF THE DRAWINGS

These and other more detailed and specific objectives will be disclosed in the course of the following specification, reference being had to the accompanying drawings in which.

DESCRIPTION OF THE PREFERRED EMBODIMENT

Figure 1:
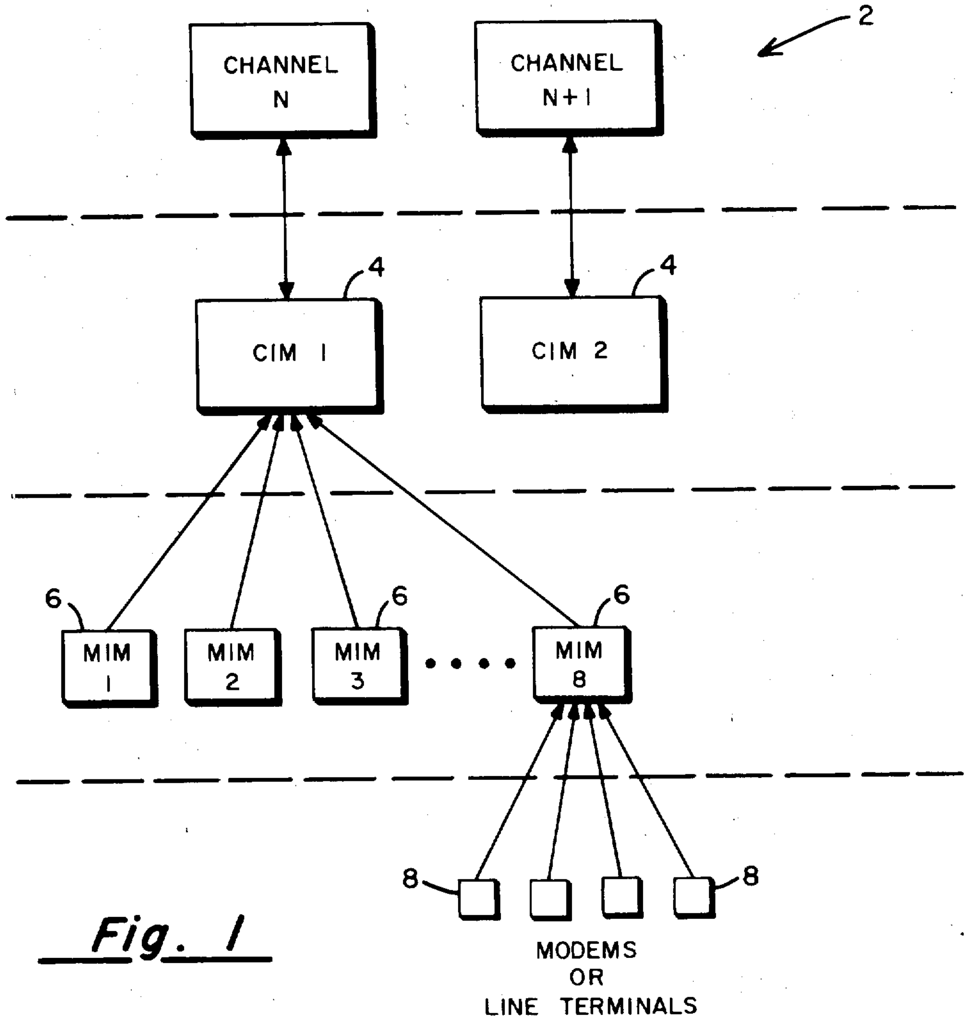
FIG. 1 is a basic block diagram of the entire system.

FIG. 1 is a basic block diagram of the entire system showing a CENTRAL PROCESSING UNIT (CPU) 2 receiving signals from a COMMUNICATION INTERFACE MODULE (CIM) 4 which, in turn, receive signals on a priority basis, either from one of eight MULTI-LINE MODULES (MIM) 6 which are high-speed signal receiving sets. Each MIM 6 receives input signals from a plurality of LINE TERMINALS 8 on a time sharing basis.

Each LINE TERMINAL 8 produces either one of four STATUS signals or DATA on its output lines to the appropriate MIM 6. The STATUS signals produced by the LINE TERMINALS 8 are the Clear To Send (CTS), the Interlock (I), the Carrier On (CO) and the Ring Indicator (RI). The CTS signal indicates that the LINE TERMINAL 8 has received and processed the Request-To-Send (RTS) signal and is ready for data. The I signal indicates that the LINE TERMINAL 8 is receiving carrier signals from a remote source. The RI signal is used in unattended answering to indicate that a remote terminal is calling the CPU.

Thus the configuration as shown in FIG. 1 provides for the CPU 2 to interface up to two CIM modules 4, each with eight MIM modules 6 and each of the MIM modules 6 receiving signals from four LINE TERMINALS 8 to provide a communications network consisting of up to 64 duplex circuits.

Figure 2:
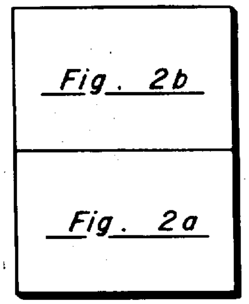
FIG. 2 shows the composite circuit relationship of FIGS. 2*a* and 2*b*.
Figure 2A:
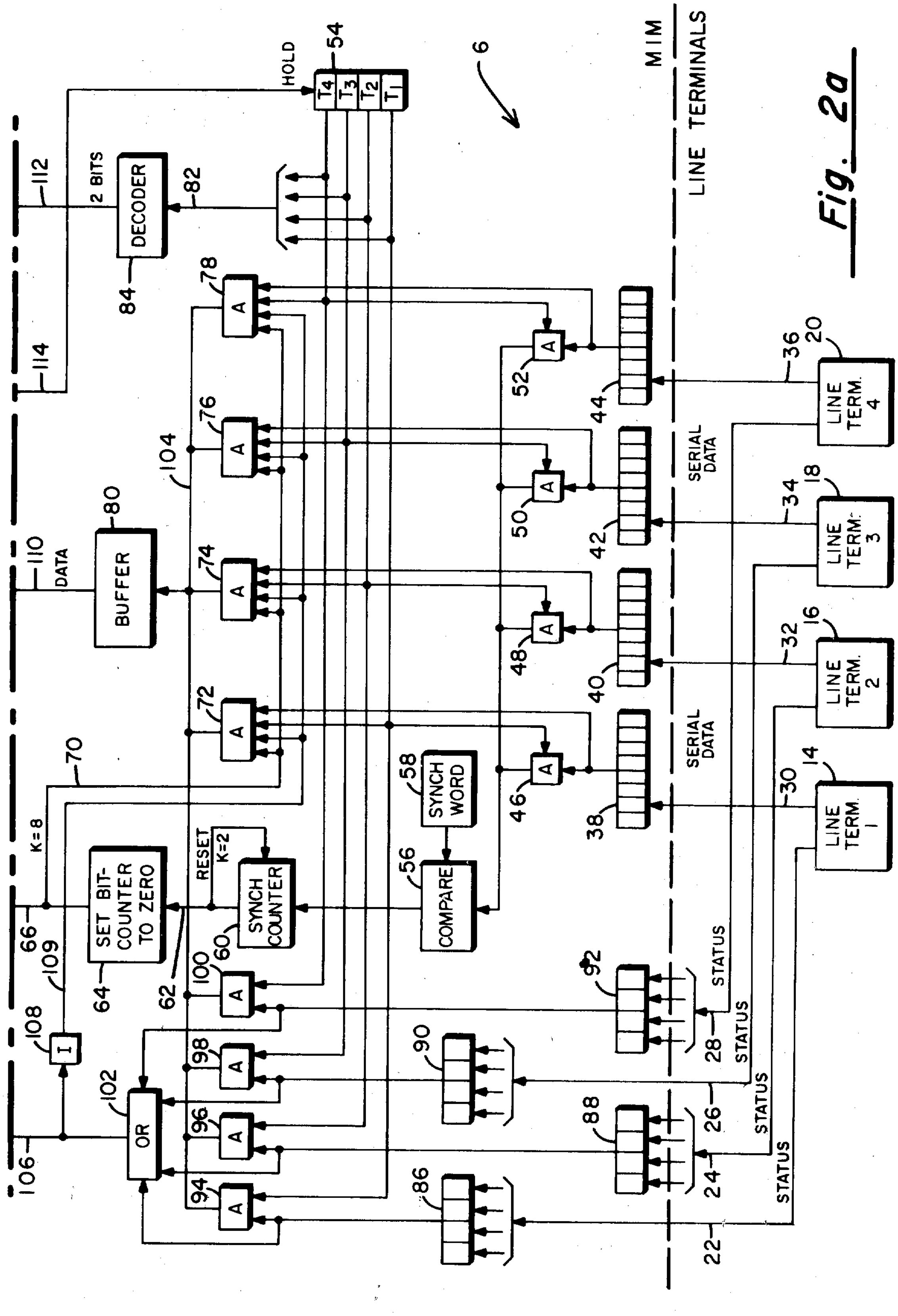
FIG. 2*a* and 2*b* are block diagrams showing the details of the system shown in FIG. 1.
Figure 2B:
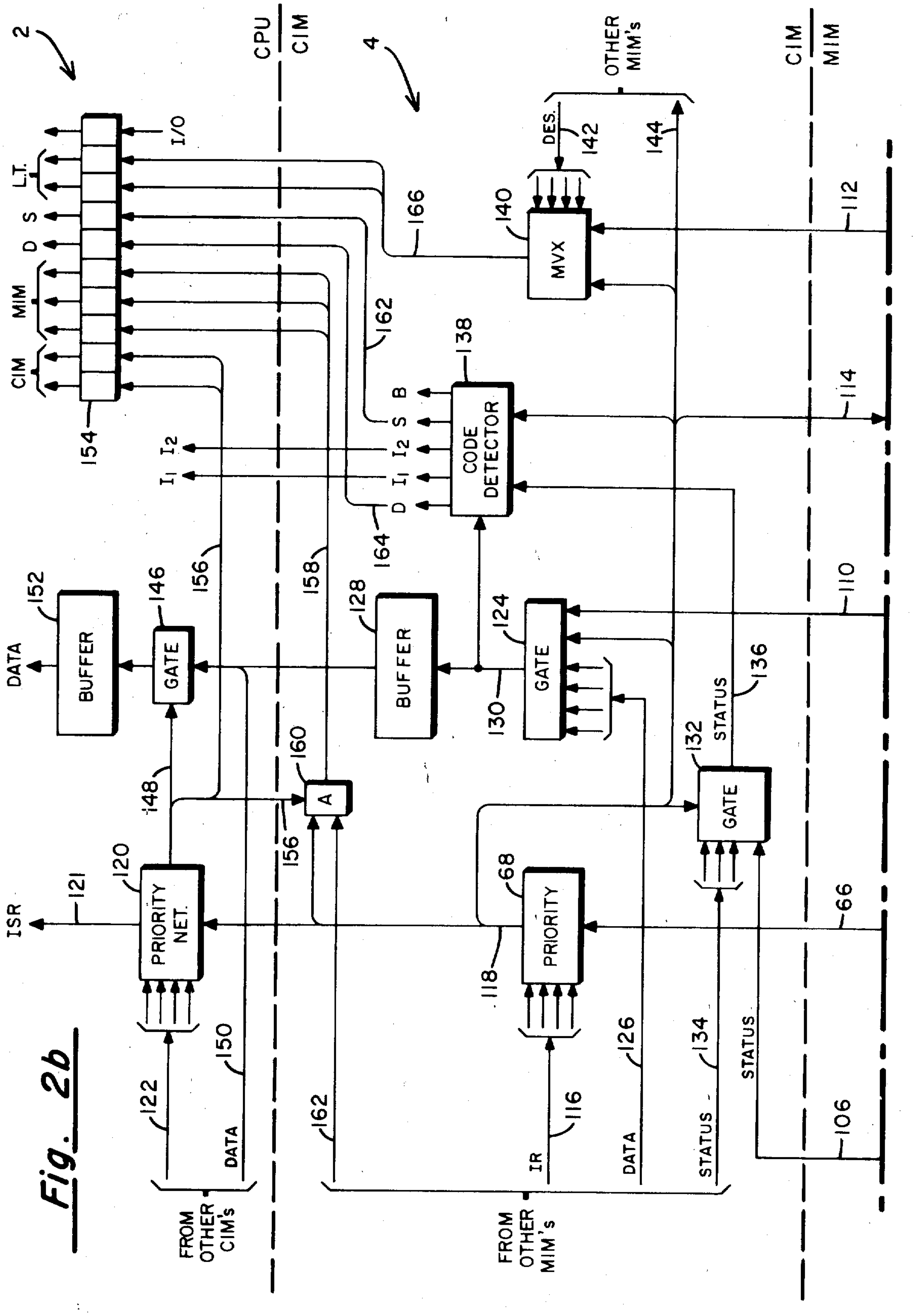

FIGS. 2*a* and 2*b* disclose the circuit details of the system shown in FIG. 1. DATA SETS or LINE TERMINALS 14, 16, 18 and 20, shown generally by the numeral 8 in FIG. 1, produce STATUS signals on lines 22, 24, 26 and 27 respectively. Both the STATUS signals and the DATA signals are coupled to a MIM 6. The data is fed serially from the LINE TERMINALS 14, 16, 18 and 20 to Input Registers (IR) 38, 40, 42 and 44 respectively. For Synchronous operation, two or more Synch Words received back-to-back indicate that data is to be presented next on the lines. The output of each of the IR registers 38, 40, 42 and 44 is coupled continuously to respective AND gates 46, 48, 50 and 52. For simplicity of the drawings, only one AND gate is shown coupled to each of the IR registers. Such practice will be followed throughout this specification, However, it should be realized that as many gates as are needed to receive the signals in parallel from the IR registers would be used in actual practice. The AND gates 46, 48, 50 and 52 are used to determine which of the LINE TERMINALS 14, 16, 18 and 20 is to be coupled to the MIM. Thus, Clock 54 sequentially produces timing signals $T_1$, $T_2$, $T_3$ and $T_4$, each of which is coupled to a respective one of the AND gates 46, 48, 50 and 52 as an enabling input. Therefore, when Clock signal $T_1$ is being produced, AND gate 46 is enabled and the signals from IR register 40 are coupled through AND gate 46 to COMPARATOR 56. In like manner, if either of the Clock signals $T_2$, $T_3$ or $T_4$ is being produced, the corresponding AND gate is enabled and the output of the IR register coupled to that AND gate is gated to the COMPARATOR 56. The other input to the COMPARATOR 56 is the output of the SYNCH WORD REGISTER (SWR) 68. Since the IR register being monitored at any time is receiving data serially, its output is continually compared with the SYNCH WORD REGISTER 58 output. Whenever a compare occurs, COMPARATOR 56 produces an output that is coupled to SYNCH COUNTER 60. Since two Synch Words back-to-back must be received before data is to be received, SYNCH COUNTER 60 is wired such that no output is produced until the two Synch Words back-to-back have been received. The manner in which this is done is old and well known in the art and will not be discussed here. Suffice it to say that when two Synch Words have been received back-to-back, the SYNCH COUNTER 60 produces an output on line 62 that not only RESETS the SYNCH COUNTER 60 itself, but also sets the BIT COUNTER 64 to a count of zero. COUNTER 60 is wired in a well-known manner to produce an output whenever it has counted to eight, for instance. The number eight is used in this instance since, for purposes of this application, eight bits form one byte or word of information being serially fed to the IR registers 38, 40, 42 and 44. Thus, after the two back-to-back Synch Words have been received, the BIT COUNTER 64 begins to count and counts to eight. At this time, a complete byte or a set of eight bits of serial information have been stored as an input character in the appropriate IR register. It will be noted that the output of each of the IR registers is also coupled to a corresponding one of the AND gates 72, 74, 76 and 78. Also coupled to each of these gates is a respective one of the clock signals $T_1$, $T_2$, $T_3$ and $T_4$ and the output of BIT COUNTER 64 on line 70. The final input to each of these AND gates is a signal on line 109 representing that the input character in the selected IR register are DATA signals and not STATUS signals. Thus, the appropriate signal from Clock 54 not only gates the output of a particular IR register to the COMPARATOR 56 for detecting the Synch Words but also through the appropriate AND gate 72, 74, 76 or 78 to the appropriate stages of BUFFER REGISTER 80.

Thus, it will be seen that the output of the particular LINE TERMINAL that is to be coupled to the MIM is determined by the output of the Clock 54 and therefore the LINE TERMINALS are time-shared by the MIM. In order that the CIM might know which of the LINE TERMINALS is transferring data to the MIM, each of the output signals from the Clock 54 is coupled to DECODER 84 via line 82 which produces two output signals or bits in a well known manner representing one of the four clock signals which, in turn, determine which of the LINE TERMINALS is sending data to the MIM.

As stated earlier, the LINE TERMINALS 14, 16 18 and 20 can produce either DATA or STATUS signals. The operation of the circuit with DATA signals has been described above. Consider now the operation when STATUS signals are present on either of the lines 22, 24, 26 and 28 from the LINE TERMINALS. These signals are coupled to corresponding ones of STATUS REGISTERS (SR) 86, 88, 90 and 92 are coupled to respective one of AND gates 94, 96, 98 and 100, as well as to OR gate 102. Each of the AND gates 94, 96, 98 and 100 is enabled by a corresponding one of the clock signals $T_1$, $T_2$, $T_3$ or $T_4$. The output of each of the AND gates 94, 96, 98 and 100 is coupled via line 104 to BUFFER REGISTER 80. The output of OR gate 102 on line 106 is coupled to INVERTER 108 which removes the enable signal on line 109 to each of AND gates 72, 74, 76 and 78 and thus prevents any information stored in the DATA REGISTERS 38, 40, 42 or 44 from being coupled to the BUFFER REGISTER 80.

Thus, when STATUS signals are presented by the LINE TERMINALS, they prevent any data signals stored in the DATA REGISTERS from being processed, and according to the Clock Signal being presented, are themselves coupled to the BUFFER REGISTER 80.

The following signals are then coupled from the MIM to the CIM: a STATUS signal on line 106, an INPUT REQUEST signal on line 66 from the BIT COUNTER 64, a STATUS or DATA message on line 110 from BUFFER REGISTER 80 and a DESIGNATOR signal on line 112 from DECODER 84, which indicates to the CIM which of the LINE TERMINALS is communicating with the MIM.

Since CLOCK 54 produces output signals $T_1$, $T_2$, $T_3$ and $T_4$ which determine which of the LINE TERMINALS can communicate with the MIM, and since more than one MIM can transmit data to a single CIM, it is imperative that CLOCK 54 hold whatever output that it is producing until the CIM notifies the MIM that it has received data. Therefore, CLOCK 54 receives a RESUME signal on line 114 from the CIM whenever the CIM is prepared to receive information from that particular MIM. Until that signal is received, the CLOCK 54 continues to produce a particular output signal and cannot advance to a successive output signal. For example, if the CLOCK 54 is producing signal $T_1$, it cannot produce signal $T_2$ until the RESUME signal is present on line 114.

Consider now the operation of the COMMUNICATION INTERFACE MODULE. The IR signal from BIT COUNTER 64 on line 66 is coupled to PRIORITY circuit 68 in the CIM. Also coupled to PRIORITY circuit 68 on cable 116 are the IR signals from the seven other MIM's which are coupled thereto. Each MIM, of course, can be operating on a different code such as ASCII, EBSIDIC, etc. PRIORITY circuit 68 can be of any well-known type which will select the highest priority line out of a plurality of lines each of which is presenting and IR signal.

Upon selecting one of the IR signals based upon priority, PRIORITY circuit 68 produces output signals on line 118 which are coupled to various locations. First, they are coupled to PRIORITY network 120 in the associated CENTRAL PROCESSING UNIT (CPU) along with signals from other equipment on cable 122. Second, they are coupled to gate 124 as an enabling signal to cause the data on line 110 from BUFFER REGISTER 80 or the data on line 126 from one of the seven other MIM's to be gated into BUFFER REGISTER 128 in the CIM via line 130. Third, they are coupled to gate 132 where they select the STATUS of one of the eight MIM's (on line 106 or on cable 134 from the seven other MIM's) and pass that STATUS on line 136 to CODE DETECTOR 138. Fourth, they are coupled directly to CODE DETECTOR 138 as a signal which indicates which MIM is communicating with the CIM. Fifth, they connect directly to MULTIPLEXOR 140 where they indicate which MIM is providing the designator on either line 112 or on cable 142 from the seven other MIM's. Finally, they are coupled directly to the CLOCK 54 via line 114 or to the CLOCK in one of the seven other MIM's via cable 144. When that signal is received by the CLOCK, it is enabled to produce the next sequential clock pulse as described above.

The output of PRIORITY NETWORK 120 in the CPU is coupled to gate 146 via line 148 and is also present on line 121 as an INPUT DATA REQUEST (IDR) signal. Also coupled as inputs to gate 146 are signals on cable 150 which represents other CIM's, PERIPHERAL INTERFACE ADAPTERS (PIA's), COMPUTER INTERFACE ADAPTERS (CIA's), etc. as well as the output from the BUFFER REGISTER 128 of the CIM shown. The output signals from PRIORITY NETWORK 120 gates the signals from the proper CIM, PIA or CIA to BUFFER REGISTER 152 in the CPU.

Two of the output bits of PRIORITY NETWORK 120 are also coupled to two stages of R-register 154 via line 156. These signals indicate to the CPU which of the two CIM's is transmitting data to the CPU.

R-register 154 also receives signals on cable 158 from gate 160 which receives signals from PRIORITY NETWORK 68 in the CIM shown as well as from the corresponding priority network in the other CIM on line 162 which indicates which MIM is transmitting data to the CIM. The two bits from PRIORITY NETWORK 120 in the CPU on line 156 are also coupled to the stages of the R-register which indicates which CIM is transmitting data.

The S and D signals from CODE DETECTOR 138 on lines 162 and 164 respectively are coupled to two stages of the R-register 154. For simplicity of the drawings, the S and D signals from the other CIM and the gate for selecting these signals from the proper CIM are not shown. However, such gating circuits are well known and would operate as shown by gate 160.

Further coupled to the appropriate stages of the R-register 154 are signals on line 166 from the MULTIPLEXOR 140. These signals indicate which LINE TERMINAL is communicating with the selected MIM. Again, for simplicity of the drawings, the signals from the corresponding multiplexor in the other CIM are not shown but well known gating circuits could be used such as that shown by gate 160.

Figure 3:
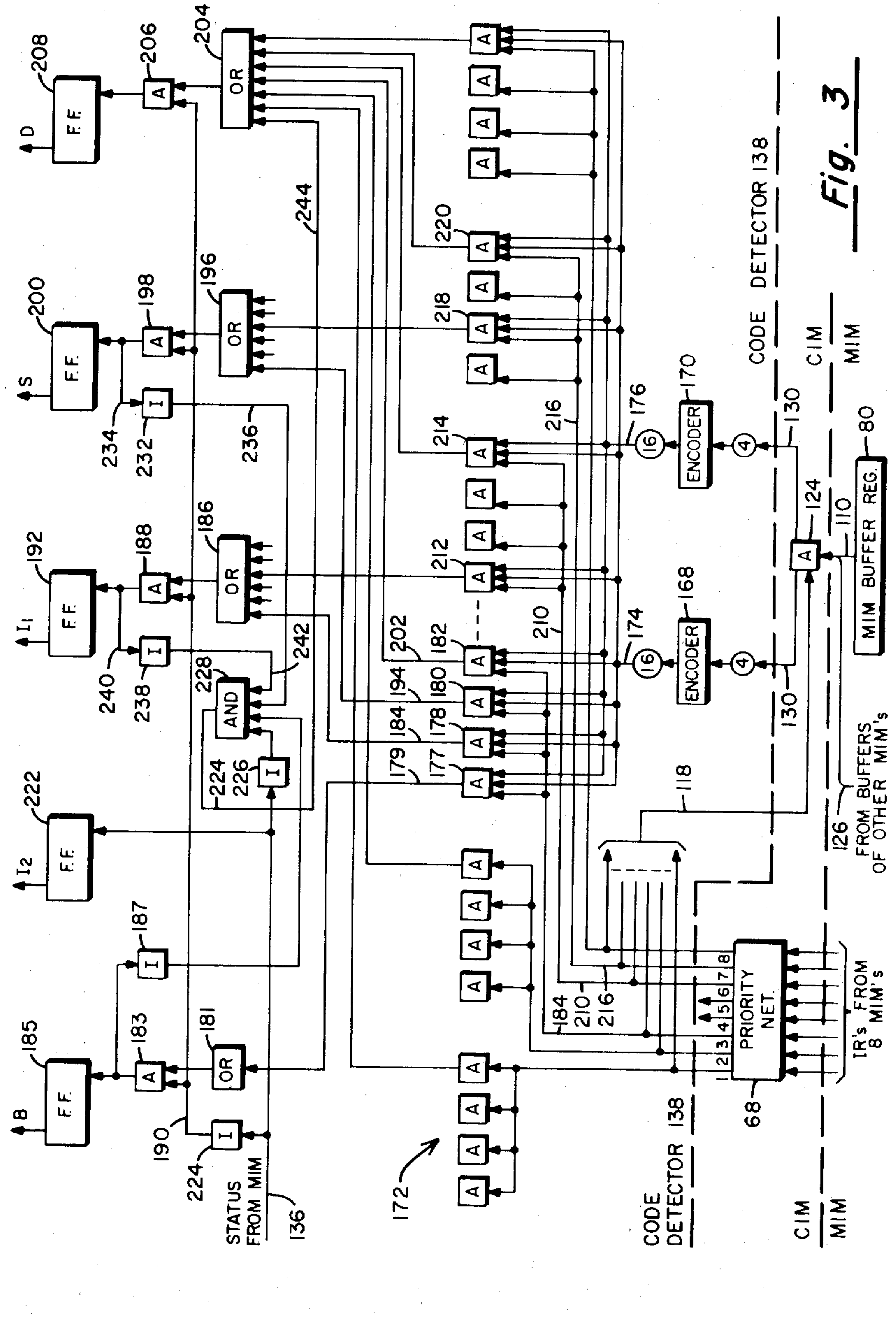
FIG. 3 is a block diagram showing the details of the normal code detector.

FIG. 3 discloses the details of the CODE DETECTOR 138. The Input Requests from the eight MIM's are coupled to PRIORITY NETWORK 68 which selects the MIM having the highest priority and produces an output signal on one line of cable 118 representing that MIM. The signal on cable 118 is coupled to gate 124 to gate the data from the selected MIM on line 110 from BUFFER REGISTER 80 or from one of the other MIM's on cable 126 to ENCODERS 168 and 170. Assuming, for example, that the data word stored in the BUFFER REGISTERS in the MIM's are 8 bits in length, 4 of these bits are coupled to ENCODER 168 and 4 are coupled to ENCODER 170. Each ENCODER can then produce 16 combinations or outputs. Combining these two groups of 16 outputs gives rise to a possibility of 256 signals. Not all of these possible signals are used but the ability exists.

PRIORITY NETWORK 68 has eight outputs each of which represents an IR from a particular MIM. Each of these outputs is coupled to a group of AND gates 172 only one of which groups is so designated on the drawings. The other inputs to these AND gates in each of said groups 172 are the signals from the ENCODERS 168 and 170. These Encoder signals may be coupled to one or more of the AND gates in each group 172. For instance, suppose that PRIORITY NETWORK 68 is producing an output on line 184 representing MIM number 3. This output is coupled to a particular group of AND gates including AND gates 178, 180 and 182. Suppose also that the data present in BUFFER REGISTER 80 which is transferred through AND gate 124 to ENCODERS 168 and 170 causes outputs from the ENCODERS 168 and 170 to be present on lines 174 and 176 respectively, the only output lines shown from the ENCODERS 168 and 170. It can be seen that lines 174 and 176 are also coupled as enable signals to AND gates 177, 178, 180 and 182.

The output of AND gate 177 on line 179 is coupled to OR gate 181 which produces an enable signal to AND gate 183. If the MIM is not producing a STATUS signal, line 190 will produce a second enable signal to AND gate 183 and cause it to produce an output that is coupled to self-clearing Flip-Flop 185. This Flip-Flop produces an output, B, representing that the input character should be Branched or stored in a new area that has been selected as the normal buffer.

The output of AND gate 178 on line 184 is coupled to OR gate 186 which produces an enable signal to AND gate 188. If the MIM is not producing a STATUS signal, line 190 will produce a second enable signal to AND gate 188 and cause it to produce an output that is coupled to self-clearing Flip-flop 192. This Flip-Flop produces an output $I_1$ representing the highest priority Interrupt. This signal $I_1$ will be used in a manner described hereinafter.

The output of AND gate 180 on Line 194 is coupled to OR gate 196 which produces an enable that is coupled to AND gate 198. Again, if the MIM that is selected is not producing a STATUS signal, line 190 will produce a second enable signal to AND gate 198 and cause it to produce an output that is coupled to self-clearing Flip-flop 200. This Flip-Flop produces an output, S, representing that the input character should be stored in the Segregation Buffer in Memory.

The output of AND gate 182 on line 202 is coupled to OR gate 204 which produces an enable that is coupled to AND gate 206. Again, if the MIM that is selected is not producing a STATUS signal, line 190 will produce a second enable signal to AND gate 206 causing it to produce an output that is coupled to self-clearing Flip-Flop 208. This Flip-Flop produces an output, D, representing that this data word should be stored in the normal Data Buffer in Memory.

Thus, it can be seen that, based upon the data words themselves, the incoming data word can be used to cause an Interrupt, to cause Branching or storage in a new buffer now designated as the normal buffer, to be stored in the Segregation Buffer in the Memory and/or to be stored in Data Buffer in the Memory. Any combination of the above uses can be obtained simply by the manner in which the output signals from the ENCODERS 168 and 170 are connected to the individual AND gates in the groups of AND gates 172.

Likewise, in considering FIG. 3 it can be seen that if the PRIORITY NETWORK selects MIM 6 on line 210, AND gates 212 and 214 produce output signals which cause self-clearing Flip-Flops 192 and 208 respectively to produce $I_1$ and D signals. Similarly, if PRIORITY NETWORK 68 selects MIM 7 by producing a signal on line 216, AND gates 218 and 220 produce outputs which cause self-clearing Flip-Flops 200 and 208 respectively to produce S and D signals.

Thus, it can be seen that up to 256 input codes could be obtained from input words by the two ENCODERS 168 and 170 and with each code a desired set of conditions could be obtained through the use of the B, $I_1$, S and D signals.

A second Interrupt signal provided by the CODE DETECTOR 138 is an $I_2$ signal representing that the input word stored in the BUFFER REGISTER 80 is a STATUS word. This signal is produced on line 136 by gate 132 as shown in FIG. 2*b*. When this signal is present on line 136 as shown in FIG. 3, it causes self-clearing Flip-Flop 222 to produce an $I_2$ signal. This signal is also coupled to INVERTER 224 which produces an INHIBIT signal on line 190 to prevent AND gates 188, 198 and 206 from activating self-clearing Flip-Flops 192, 200 and 208. Thus, no B, D, S or $I_1$ signal can be produced when the $I_2$ STATUS signal is present from self-clearing Flip-Flop 222. Likewise, when no STATUS signal is present on line 136, INVERTER 224 causes an ENABLE signal to be present on line 190 which is used as described previously to allow self-clearing Flip-Flops 192, 200 and 208 to be activated.

It will also be noted that STATUS line 136 is coupled to INVERTER 226 and the output of which is coupled to AND gate 228. Thus, when a STATUS signal is present on line 136, INVERTER 226 presents an INHIBIT signal to be presented to AND gate 228.

It is obvious that if the Input Character does not establish an $I_1$, $I_2$, B or S output signal from the CODE DETECTOR 138, then it must be a Data Word and should produce a D output signal. This is accomplished through AND gate 228. Two ENABLE signals to AND gate 228 have already been described. A third ENABLE signal is provided by INVERTER 232. If AND gate 198 does not produce an output (and thus no S output signal is produced by self-clearing Flip-flop 200), INVERTER 232, which is coupled to AND gate 198 by line 234, produces an output signal on line 236 which is coupled as an ENABLE signal to AND gate 228. The fourth ENABLE signal for AND gate 228 is provided by INVERTER 238 which is coupled to AND gate 188 by line 240. If AND gate 188 does not produce an output (and thus no $I_2$ output signal is produced by self-clearing Flip-Flop 192), INVERTER 238 produces an output signal on line 242 which is coupled as an ENABLE signal to AND gate 228. In like manner, if no B output signal is produced, INVERTER 187 produces an enable to AND gate 228. The output of AND gate 228 on line 244 is coupled to OR gate 204 which produces an output signal that ENABLES the AND gate 206 and causes it to activate self-clearing Flip-Flop 208 which produces a D output signal representing that Data is present on the input line.

Figure 4:
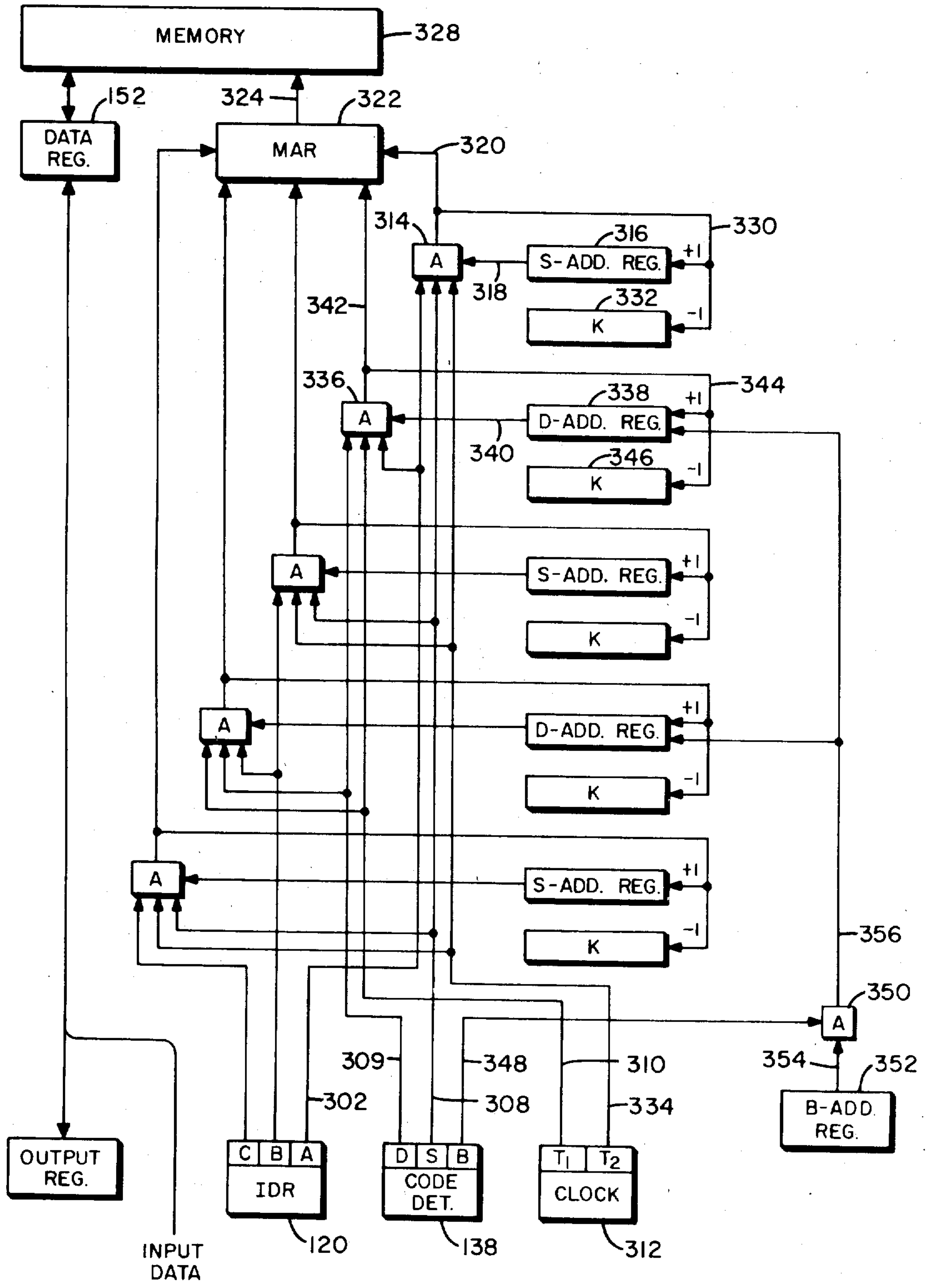
FIG. 4 discloses the circuitry which causes temporary and permanent switching of buffer storage areas for incoming characters.

Thus, if the Input Word stored in BUFFER REGISTER 80 does not form any of the codes which would cause a D signal to be present at the output of the CODE DETECTOR 138 and if it does not form any of the codes which would cause either an $I_1$, an S, a B or a D output signal, and if it is not a STATUS signal and no $I_2$ signal is produced, then AND gate 228 causes a D signal to be forced from self-clearing Flip-Flop 208. The Input Word, then is designated as DATA if it, in itself, does not cause a B, D, S or $I_1$ signal to be produced and if the word is not a STATUS word. FIG. 4 discloses the circuitry which utilizes the S, B and D signals from CODE DETECTOR 138 shown in FIG. 2*b* to cause switching between memory buffer storage areas based on the incoming data itself. It will be remembered from the discussion of FIG. 3 that S, B and D signals are determined from the content of the data word itself that is being presented to the CENTRAL PROCESSING UNIT.

Considering FIG. 4 assume that a priority network 120 has selected External Device A to communicate with the CPU and an INPUT DATA REQUEST (IDR) signal is present on line 302. Assume also that the data from Device A is coupled to INPUT DATA BUFFER 152 and that this data has caused both an S and a D signal to be present on lines 308 and 310 respectively from CODE DETECTOR 138. AND gate 314 is now enabled with the signal from Device A on line 302, the S signal from CODE DETECTOR 138 on line 308 and the clock pulse $T_2$ on line 334 from CLOCK 312. Thus, the address stored in ADDRESS REGISTER 316 and present on line 318 which is coupled to an AND gate 314, is gated through AND gate 314 on line 320 to MEMORY ADDRESS REGISTER (MAR 322. The output of the MAR 322, of course, is on line 324 and is used to specify the address at which the data character in INPUT DATA BUFFER 152 is to be stored in MEMORY 328. Further, the output of AND gate 314 is coupled, via line 330, to ADDRESS REGISTER 316 and COUNTER 332. The signal on line 330 causes the ADDRESS REGISTER 316 to be incremented by one count so that it will be ready to specify the address of the next sequential location in the MEMORY section with which ADDRESS REGISTER 316 is associated. COUNTER 332 is decremented by one count to indicate that one of the locations in this section of memory has been used.

Thus, the S signal on line 308 from CODE DETECTOR 138 has caused the data on input line 304 to be stored in what might be called the SEGREGATION BUFFER in MEMORY 328.

But note also that when Clock 312 produces pulse $T_1$ on line 310 that AND gate 314 is disabled by the removal of clock pulse $T_2$ and AND gate 336 is enabled by the presence of clock pulse $T_1$, AND gate 336 has as inputs the D signal on line 309 from CODE DETECTOR 138, the signal from External Device A on line 302 from PRIORITY NETWORK 120 and the output from ADDRESS REGISTER 338 on line 340. AND gate 336 passes the data stored in ADDRESS REGISTER 338 to MEMORY ADDRESS REGISTER 322 via cable 342. This address in REGISTER 322 causes the data in INPUT DATA BUFFER 152, the same data previously stored in the SEGREGATION BUFFER section of MEMORY 328, to be stored now in the DATA BUFFER section of MEMORY 328, the normal buffer. Again, the output of AND gate 336 on line 344 is coupled back to ADDRESS REGISTER 338 to cause it to be incremented by one count in order that it might store the address of the next sequential location in the DATA BUFFER section of MEMORY 328 and to Counter 346 to cause it to indicate that one address in the DATA BUFFER section of MEMORY 328 has been used.

Thus, it can be seen that the data word itself has caused circuits to be activated that stored the data word in two different locations in MEMORY 328. It is obvious, of course, that if only the S signal has been present on line 308 from the CODE DETECTOR 138 that the data would have been stored only in the SEGREGATION BUFFER section of the memory. Likewise, if only the D signal has been present on line 310 from the CODE DETECTOR 138, the data would have been stored only in the DATA BUFFER section of the memory.

If Branching or switching of normal buffer areas is required, CODE DETECTOR 138 outputs a B signal on line 348 to AND gate 350. The other input to AND gate 350 is the address stored in B ADDRESS REGISTER 352 on line 354. B ADDRESS REGISTER 352 has stored therein the address of the new, normal buffer to which, when selected, the input data will be switched. Thus, when the B signal is produced by CODE DETECTOR 138 on line 348, it causes AND gate 350 to transfer the address in B ADDRESS REGISTER 352 to D ADDRESS REGISTER 338 via line or cable 356. Since the D ADDRESS REGISTER 338 contains the address of the normal buffer being used, it can be seen that the normal buffer has been switched to a new address.

Thus, it can be seen that the circuitry shown in FIG. 4 allows the incoming message control character to cause either Branching or Segregation to occur based upon the message control character itself.

Because the B, S D and $I_1$ signals can all be produced simultaneously, it will be seen that the program can also be alerted with the $I_1$ signal when any buffer has expired.

Finally, it should be noted that the $I_2$ signal, the status signal, overrides and disables all other output signals from the CODE DETECTOR 138.

It is obvious that the remainder of the circuit shown in FIG. 5 operates in a similar manner to that discussed and that if the PRIORITY NETWORK 120 had selected External Device B or C, a similar operation would have resulted.

Since the data word itself enables switching between storage areas in the MEMORY 328, the circuit shown enables the incoming data to be multiplexed without utilizing programming to determine how the incoming data is to be handled.

It is understood that suitable modification may be made in the structure as described and disclosed provided that such modifications come within the spirit and scope of the appended claims. Having now, therefore, fully illustrated and described our invention, what we claim to be new and desire to profit by Letters Patent is:

1. In a computer system having a memory, a method of controlling the branching and segregating of received input characters comprising the steps of:

a. receiving a plurality of input characters in different codes,
b. selecting one of said codes,
c. decoding each individual character in said selected code to derive control signals from each said character, and
d. storing each said character itself in a particular location in memory as determined by said control signals derived from it.

2. In a computer system, a method of segregating and branching input characters which are to be stored in a memory comprising the steps of:

a. receiving input characters,
b. deriving storage control signals from each input character, and
c. storing each said input character in an area in memory selected by said control signals derived from said character.

3. In a computer system, a method of routing input characters which are to be stored in a memory comprising the steps of:

a. receiving input characters,
b. deriving one of various combinations of first, second and third control signals from each said input character, and
c. storing each said input character in a first area in memory when said first control signal is derived and in a second area in memory when said second control signal is derived and in a third area in memory when said third control signal is derived whereby each incoming character itself determines where in memory it is to stored.

4. In a computer system, a circuit for routing input characters to predetermined storage areas in memory comprising:

a. first and second buffer control word registers for storing different memory addresses at which input characters are to be stored,
b. a decoder for receiving input characters and deriving control signals from each individual character received, and
c. means coupled to said buffer control word registers and to said decoder for receiving the control signals derived from each individual character and selecting the buffer control word register containing the memory address at which the individual character is to be stored depending upon the said control signals derived from it whereby the selected memory address causes said character to be stored thereat in memory.

5. A circuit as in claim 4 further including:

a. means coupled to each of said buffer control word registers for automatically incrementing the address in the selected one of said registers each time a character is stored in memory whereby subsequently received characters selecting the same register are stored sequentially in memory.

6. A circuit as in claim 5 further including:

a. an additional memory address register having a memory address different from the first and second buffer control word registers, and
b. means coupled to said first buffer control word register, said decoder and said additional memory address register for transferring the said different memory address from said additional memory address register to said first buffer control word register when the proper control signals are derived from one of said input characters whereby that input character and subsequently received input characters that produce control signals selecting said first buffer control word register are sequentially stored in a new location in memory.

UNITED STATES PATENT OFFICE
CERTIFICATE OF CORRECTION

Patent No. 3601810 Dated August 24, 1971

Inventor(s) Duane H. Anderson, Peter A. Meyer and Paul D. Byrns

It is certified that error appears in the above-identified patent and that said Letters Patent are hereby corrected as shown below:

Column 1, Line 63 - After "of" delete "reach" and insert -- each --.

Column 2, Line 35 - After "which and before "the" delete "diverts" and insert -- divert --.

Column 4, Line 22 - After "respective" and before "of" delete "one" and insert -- ones --.

Column 5, Line 19 - After "which" delete "represents" and insert -- represent --.

Column 7, Line 67 - Add ")" after "Mar".

Column 8, line 63 - Delete "5" and insert -- 4 --.

Column 9, line 33 - Before "stored" insert -- be --.

Signed and sealed this 2nd day of May 1972.

(SEAL)
Attest:

EDWARD M.FLETCHER, JR.
Attesting Officer

ROBERT GOTTSCHALK
Commissioner of Patents

ORM PO-1050 (10-69)
USCOMM-DC 60376-P69
☆ U.S. GOVERNMENT PRINTING OFFICE : 1969 O—366-334